United States Patent [19]
Jensen

[11] Patent Number: 5,210,838
[45] Date of Patent: May 11, 1993

[54] METHOD AND APPARATUS FOR PREDICTING THE EFFECTIVE ADDRESSES OF FUTURE MEMORY LOAD OPERATIONS IN A MICROPROCESSOR

[75] Inventor: Eric H. Jensen, Livermore, Calif.

[73] Assignee: Sun Microsystems, Inc., Mountain View, Calif.

[21] Appl. No.: 523,718

[22] Filed: May 15, 1990

[51] Int. Cl.[5] ............................ G06F 9/34; G06F 9/38
[52] U.S. Cl. .................................... 395/400; 395/375; 364/DIG. 1; 364/231.8; 364/251.1; 364/255.1; 364/263; 364/263.1
[58] Field of Search ............... 395/400, 425, 375; 364/DIG. 1, DIG. 2

[56] References Cited
U.S. PATENT DOCUMENTS

| | | | |
|---|---|---|---|
| 4,236,205 | 11/1980 | Kindseth et al. | 395/425 |
| 4,371,924 | 2/1983 | Schaefer et al. | 395/425 |
| 4,583,162 | 4/1986 | Prill | 395/400 |
| 4,918,587 | 4/1990 | Pechter et al. | 395/400 |
| 5,007,011 | 4/1991 | Murayama | 395/425 |
| 5,093,777 | 3/1992 | Ryan | 395/400 |

*Primary Examiner*—David L. Clark
*Assistant Examiner*—Matthew C. Fagan
*Attorney, Agent, or Firm*—Blakely, Sokoloff, Taylor and Zafman

[57] ABSTRACT

A method and apparatus for loading a data value for a future LOAD instruction in a microprocessor by predicting the LOAD instruction's effective address. At each occurrence of a LOAD instruction, the effective address used is stored in a memory array which stores a last effective address and a next-to-last effective address. At a specified period before each LOAD instruction, the microprocessor loads a data value from a predicted effective memory address computed from the memory array. The predicted effective memory address is equal to the last effective address plus the difference between the last effective address and the next-to-last effective address. If the predicted effective address equals the actual effective address of the future LOAD instruction, the loaded data value is used.

6 Claims, 3 Drawing Sheets

| CLOCK | $t_0$ | $t_1$ | $t_2$ | $t_3$ | $t_4$ | $t_5$ | $t_6$ | $t_7$ | $t_8$ |
|---|---|---|---|---|---|---|---|---|---|
| INSTR. 1 | FETCH | DECODE | EXEC. | | | | | | |
| INSTR. 2 | | FETCH | DECODE | EXEC. | | | | | |
| INSTR. 3 | | | FETCH | DECODE | EXEC. | | | | |
| LOAD | | | | FETCH | DECODE | EXEC. | EXEC. | EXEC. | |
| INSTR. 5 | | | | | FETCH | DECODE | DELAY | DELAY | EXEC. |

*Figure 1*

| TAG | LEA | NLEA | STATUS |
|---|---|---|---|
| | | | |
| | | | |
| | | | |
| TAG BITS | $LEA_{i-4}$ | NLEA | 1 |
| | | | |
| | | | |
| | | | |
| | | | |
| | | | |

METHOD AND APPARATUS FOR PREDICTING THE EFFECTIVE ADDRESSES OF FUTURE MEMORY LOAD OPERATIONS IN A MICROPROCESSOR

BACKGROUND OF THE INVENTION

1. Field of the Invention

This invention relates to computer circuitry and, more particularly, to methods and apparatus for accelerating the operation of computer processors.

2. History of the Prior Art:

Reduced instruction set (RISC) computers offer advantages in speed over other computers because they are able to execute an instruction almost every clock cycle. This is accomplished by pipelining (overlaying in time) the various stages of each operation so that each instruction execution is followed by the execution of the next instruction. Pipelining functions well so long as the instructions each included the same number of individual operations, usually fetch, decode, execute, and write back. However, certain instructions such as load and store instructions generally require more individual operations because they require sending information off the processor chip or retrieving information from off the chip or because more individual steps need to be accomplished. Reducing the time required for the execution of load and store operations in computers which utilize pipelining techniques is consequently of great importance to system speed.

SUMMARY OF THE INVENTION

It is, therefore, an object of the present invention to accelerate the operation of computer processors.

It is another more specific object of the present invention to increase the speed of operation of computer systems the processors of which utilize pipelining techniques.

These and other objects of the present invention are realized in a method of predicting the addresses of information required by a processor operation comprising the steps of recording the effective address of a load instruction at a position which may be indexed by an address of an instruction to be executed a selected number of steps earlier, recording the effective address for any load operation already stored at the position at a second position which may also be indexed by the address of the instruction to be executed a selected number of steps earlier, determining for each instruction whether previous load instruction are indexed against its address, determining the difference between the two last load instructions indexed against the instructions address, and adding the difference to the address of the last load instruction to obtain a predicted address for a next load instruction. By anticipating the load instruction in the pipeline a number of operational steps before the load instruction arrives at the point at which its address is computed, predicting the address which the instruction will access, and deriving the data at the address, the information may be ready for use by the load instruction at the next clock cycle after the load instruction appears thereby eliminating the delay associated with load instructions in the typical pipelined processor operation.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a timing diagram illustrating the operation of a pipelined computer processor.

FIG. 2 is a diagram illustrating a memory arrangement for implementing the present invention.

NOTATION AND NOMENCLATURE

Figure 3:
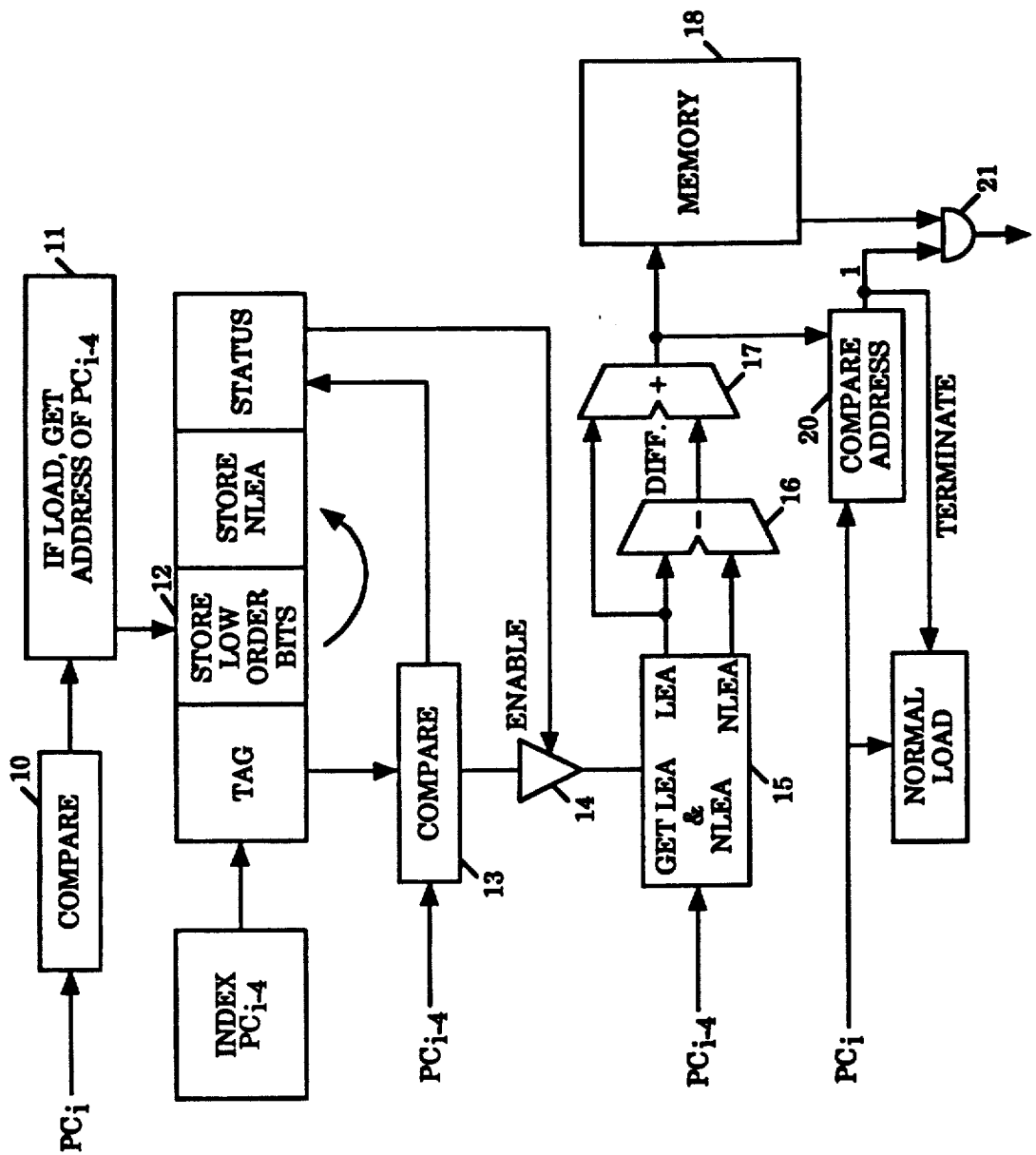
FIG. 3 illustrates a flow diagram which illustrates the operations in accordance with the invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

As pointed out above, RISC computers offer advantages in speed over other computers because they are able to execute an instruction almost every clock cycle by pipelining the various stages of each instruction so that each instruction execution is followed by the execution of the next instruction. Pipelining techniques function well so long as the instructions each include the same number of individual operations, usually fetch, decode, execute, and write back. FIG. 1 illustrates a time diagram in which five individual instructions are pipelined. It will be seen that the first three instructions each have their operational stages overlaying one another so that an instruction is executed once each clock cycle.

However, certain instructions such as load and store instructions generally require more individual operations because they require sending information off the processor chip, retrieving information from off the chip, or include more positions to be accessed than there are available ports. Load instructions are, typically, those requiring the longest time for completion. The fourth instruction in FIG. 1 is a load instruction. It will be seen that after the instruction has been fetched, decoded, and an effective address computed for the load information in the first two stages of the load operation, a substantial number of clock cycles (three are illustrated) are required before the information is returned from memory so that it may be used by the instruction following the load instruction. Consequently, the processor is forced to delay the execution of the next instruction until the results of the load operation are available. Reducing the time required for the execution of load and store operations in computers which utilize pipelining techniques is consequently of great importance to system speed.

Load instructions appear particularly susceptible to improvement in the time it takes for one to execute. Sequences of instructions occur over and over again so that a load instruction occurs after a particular set of other instructions a number of times; when this occurs the information to be accessed will usually be in a memory address a given number of addresses beyond the last effective address of the load instruction. Because of these reoccurring situations, prediction of a load address seams a possible way to increase processor speed.

The present invention utilizes a technique for predicting the memory address which a next load operation will access in order to reduce the time required for operation of a computer system. By anticipating the load instruction in the pipeline a number of operational steps before the load instruction arrives at the point at which its address is computed, using information regarding prior load operations to predict the address which the instruction will access, and fetching the data at the predicted address, the information may be ready for use at the next clock cycle after the load instruction appears thereby eliminating the delay associated with load instructions in the typical pipelined processor operation.

In order to accomplish this desired result, the present invention stores in a memory a prediction table including the effective addresses of past load operations. The effective addresses of the last and the next-to-last load operations are stored in the table at a position indexed by an instruction occurring before the load instruction. The effective addresses of the last and the next-to-last load operations are compared in order to determine the address difference between load operations. This address difference is added to the effective address of the last load operation and provides a new predicted address. This new predicted address is accessed to provide what is hoped is the information which the new load operation will require. In order to determine whether, in fact, this is the correct information, the predicted address is compared with the actual effective address of the load instruction. If the addresses are the same, the information is correct and is immediately available for use by the processor without any delay at all. If the addresses are not the same, then the load operation is executed in its normal time sequence using the effective address of the load instruction. Consequently, time is either saved by the prediction operation; or the usual time for a load operation is required. In no case does the operation increase the time for accessing the load address.

Figure 2:
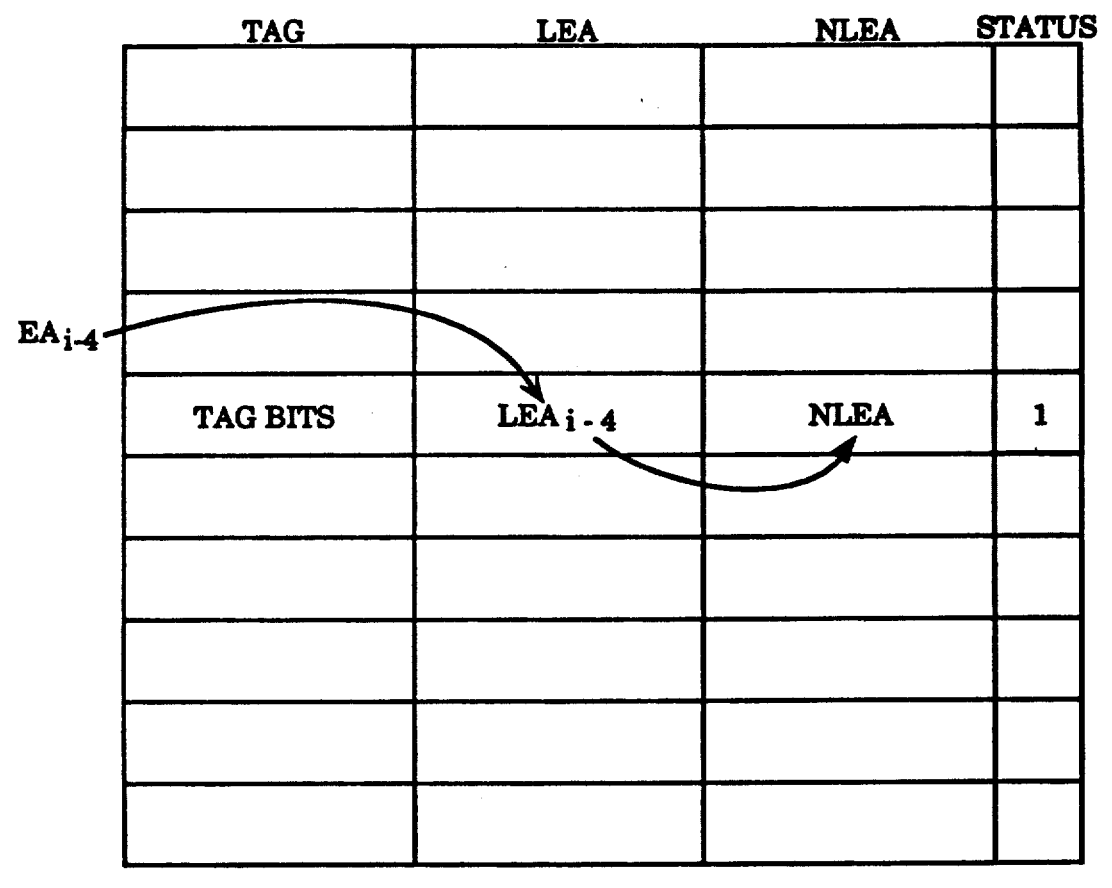

FIG. 2 illustrates a prediction table in accordance with the invention. The table includes a number of lines of memory. In each line of memory are stored a number of individual entries. In the basic arrangement, those entries are the effective addresses used in load operations which have already been completed by the particular software program. Each line of the prediction table is accessed by the low order bits of an address which occurred a preselected number of instructions prior to the load instruction. The access address is typically furnished to the program counter of the processor and is associated with each instruction in the pipeline. This addressing of the low order bits to access a line of the prediction table is accomplished in the same manner as indexing into any typical memory array. The number of low order bits used depends on the number of lines of memory which it is desired to include in the prediction table. An exemplary table might utilize eleven bits to provide 2K lines of memory.

Two operations are accomplished with respect to the prediction table, a record operation and a predict operation. A record operation takes place each time a load operation occurs. In a record operation, the effective address of the load instruction is placed into the LEA column at an appropriate index position. In an exemplary system where it is desired to begin the prediction operation four operations before the load operation which is to be predicted, the effective address of the load instruction is indexed by the address of the instruction four instructions before the load instruction. The number of steps to go back in the pipeline to store the bits is a matter of choice based on the most likely time required to execute a load operation. The instruction four instructions prior to the load instruction is usually available in a pipelined system because a number of stages must be held to provide for the occurrence of interrupts; if not otherwise available, a short first-in first-out circuit may provide the information.

As described, the effective address of the present load instruction is placed into the LEA space of the prediction table for the instruction four clock times previous. If this sequence of instructions is repeated, the next time the instruction four instructions prior to this load operation is executed, the last computed effective address of the load operation instructions is immediately available for use.

If an effective address already resides in the LEA space required for the present effective address, the old effective address is moved to a memory space in a column NLEA which indicates the next-to-last effective address. Since the only way an address may appear in the LEA space is to be indexed in by a record operation, any address previously placed in the LEA column indicates a load instruction which occurred when the present load instruction was accessed previously. It will be noted by those skilled in the art that the difference between these two sets of effective addresses in the LEA and NLEA columns indicates the difference in the last two effective load addresses at this index value, that is, how far the addresses are separated from one another. This difference value may then be added to the value of the last effective address (LEA) to obtain a new address to which the next load instruction will probably be directed.

The predict operation takes the program counter value of the current instruction, reads the value of the effective address in the LEA column in the table, adds that value to the difference between the effective addresses in the LEA column and the NLEA column for the line, and pre-accesses the information at that address so that it will be ready when the load instruction executes four instructions later.

Testing the operation of the invention in predicting the address of a next load has proven its efficacy. For example when used wit ha program to predict integer load address operation in a SPRAC-based RISC system, the arrangement predicted over ninety percent of load addresses when the number of bits used to index the line in the prediction table was greater than seven. In like manner, when used with a program to predict floating point load address operations in a SPARC-based RISC system, the arrangement predicted between eighty and ninety percent of load addresses when the number of bits used to index the line of the prediction table was greater than five.

Two optimizations of the prediciton table to increase the efficiency of the operation are shown in FIG. 2. The more accurately the index address is specified, the more accurate will be the prediction. Therefore, the first optimization includes a first additional column illustrated to the left in FIG. 2. In this column a tag may be stored to assist in indexing the effective addresses stored in the LEA and NLEA columns. In a preferred embodiment of the arrangement, the tag may include a number of high order bits of the address held in the program counter for the instruction four clock periods previous. In a preferred embodiment, all of the bits above the low order bits used for indexing into the line are used. These bits may be placed in the tag column when the effective load address is placed in the LEA column during the record operation. The tag bits substantially decrease the likelihood that the effective addresses will be from two different load instructions (those from two different pages of memory) and produce a useless prediction. The tag bits assure that the instruction four clocks before the load instruction is the same instruction at which the tag bits were stored. The tag column therefore substantially increases the accuracy of the prediction.

A second optimization includes a fourth column in the prediction table in which are stored status bits. In a preferred embodiment of the invention, a single status bit is utilized. It will be noted that the prediciton mechanism is only effective when there are values in both the LEA and the NLEA columns of the prediction table, for only in this case is a difference in addresses provided. In order to eliminate cases in which the values in the two columns stored do not relate to the same load operations, the system compares the value to be placed in the tag column for a new entry with the old value in the tag column. If the values of them differ, then the status bit is set to zero to indicate that this is an operation involving new addresses; and, consequently, the difference value is not valid. If the values of the tags are the same, then the status bit is set to one. When the prediction is read, the value of the status bit is renewed. If it is zero, the result of the prediction is ignored. If the result is one and the tags compare, the result is very likely to be valid.

FIG. 3 illustrates a flow diagram which illustrates the operations in accordance with the invention. In FIG. 3, at step 10 the instruction PCi to be executed is received and a comparison is made to determine whether the instruction is a load instruction. If the present instruction PCi is a load instruction, the address of the instruction four steps earlier ($PC_{i-4}$) is obtained at step 11. The effective address of instruction PCi is stored in the prediction table 12 under the index for the instruction four steps earlier ($PC_{i-4}$); and any effective address in the LEA position is shifted to the NLEA column. If a tag address column is included in the prediction table, this column may be filled with a number of high order bits from the instruction four steps earlier ($PC_{i-4}$) held in the program counter; and the status bit may be updated by a comparison at step 13 of the high order bits of the instruction four steps earlier with the tag. This is all that is required for the record operation.

FIG. 3 also illustrates the steps for carrying out the prediction operation. As each instruction reaches the decode stage, its address is used to index into the prediction table 12 to retrieve the entries for LEA and NLEA at step 15. If the comparison at step 13 which checks the tag of the line accessed with the address of the instruction agrees that the high order bits are the same and if the status bit is one, the values of the effective addresses in the LEA and NLEA columns are retrieved at step 15 and transferred to a subtractor at step 16 which provides the difference between the last effective address (LEA) and the next-to-last effective address (NLEA) as an output value. This value is furnished to an adder at step 17 along with the last effective address. It should also be noted that the steps 16 and 17 could be replaced by a step which shifts the last effective address left by one bit position (to double the value) and subtracts from it the next-to-last effective address. The output of the adder at step 17 is used to access memory at step 18 for the load information. The predicted effective address is also compared at step 20 with the effective address of the load instruction when it arrives. If the values compare, an enabling output is provided to an AND gate at step 21 to allow the use of information at the predicted address in the instruction following the load instruction. At the same time, the normal load operation commences and is terminated if the comparison at step 20 provides an enabling output to the AND gate 21. Otherwise, the normal load operation continues and executes in its usual time period.

Although the present invention has been described in terms of a preferred embodiment, it will be appreciated that various modifications and alterations might be made by those skilled in the art without departing from the spirit and scope of the invention. For example, the arrangement of the present invention might be used to predict other than load addresses were there a need for such prediction in a particular system. The invention should therefore be measured in terms of the claims which follow.

What is claimed is:

1. A method for loading a data value from a memory into a microprocessor for a future LOAD instruction, said microprocessor having a program counter containing an address of a current instruction and having a memory array comprising a plurality of memory lines, each of said memory lines comprising a last effective address field storing a last effective address and a next-to-last effective address field storing a next-to-last effective address, said method comprising the steps of:

a) updating said memory array during execution of a current LOAD instruction by said microprocessor, said updating step comprising the substeps of:

i) indexing into said memory array to select a first one of said memory lines using a set of low order bits from a memory address of a first instruction located before said current LOAD instruction,
  ii) moving the last effective address in the last effective address field of said first memory line to the next-to-last effective address field of said first memory line, and
  iii) storing a current effective address of the current LOAD instruction in the last effective address field of said first memory line;
 b) loading a data value from said memory for a future LOAD instruction, said loading step comprising the substeps of:
  i) indexing into said memory array to select a second one of said memory lines using a set of low order bits from said program counter,
  ii) predicting an effective address by adding the last effective address of said second memory line to a difference between the last effective address of said second memory line and the next-to-last effective address of said second memory line, and
  iii) loading said data value from said memory using said predicted effective address; and
 c) using said data value if the predicted effective address matches an effective address of the future LOAD instruction.

2. The method as claimed in claim 1 wherein said memory array further comprises a tag field and a status bit field in each memory line of said memory array, said tag field storing a tag comprising a set of high order address bits, said status bit field storing a status bit, and said updating step (a) further comprises the substeps of:
 updating the status bit of said first memory line during execution of the current LOAD instruction by said microprocessor by setting the status bit of said first memory line if a set of high order bits of said memory address of said first instruction match the tag of said first memory line; and
 moving the set of high order bits of said memory address of said first instruction to the tag field of said first memory line during execution of the current LOAD instruction;
 and further wherein said loading step (b) loads said data value only if the status bit of said second memory line is set.

3. The method as claimed in claim 2 wherein said first instruction is located four instructions before said current LOAD instruction.

4. An apparatus in a microprocessor for loading a data value from a memory into the microprocessor for a future LOAD instruction, said microprocessor having a program counter containing an address of a current instruction, said apparatus comprising:
 a) a memory array comprising a plurality of memory lines, each of said memory lines comprising a last effective address field storing a last effective address and a next-to-last effective address field storing a next-to-last effective address;
 b) means for updating said memory array during execution of a current LOAD instruction by said microprocessor, said updating means comprising:
  i) means for indexing into said memory array to select a first one of said memory lines using a set of low order bits from a memory address of a first instruction located before said current LOAD instruction,
  ii) means for moving the last effective address in the last effective address field of said first memory line to the next-to-last effective address field of said first memory line, and
  iii) means for storing a current effective address of the current LOAD instruction in the last effective address field of said first memory line;
 c) means for loading a data value from said memory for a future LOAD instruction, said loading means comprising:
  i) means for indexing into said memory array to select a second one of said memory lines using a set of low order bits from said program counter,
  ii) means for predicting an effective address by adding the last effective address of said second memory line to a difference between the last effective address of said second memory line and the next-to-last effective address of said second memory line, and
  iii) means for loading said data value from said memory using said predicted effective address; and
 d) means for using said data value if the predicted effective address matches an effective address of the future LOAD instruction.

5. The apparatus as claimed in claim 4 further comprising:
 a tag field in each memory line of said memory array, said tag field storing a tag comprising a set of high order address bits;
 means for updating the tag field of said first memory line during execution of the current LOAD instruction by said microprocessor by storing a set of high order bits of said memory address of said first instruction;
 a status bit in each memory line of said memory array, said status bit field storing a status bit; and
 means for updating the status bit of said first memory line during execution of the current LOAD instruction by said microprocessor by setting the status bit of said first memory line if a set of high order bits of said memory address of said first instruction match the tag of said first memory line;
 wherein said data value loading means loads said data value only if the status bit of said second memory line is set.

6. The apparatus as claimed in claim 5 wherein said first instruction is located four instructions before said current LOAD instruction.

* * * * *